United States Patent [19]

Bennett et al.

[11] Patent Number: 4,626,359

[45] Date of Patent: Dec. 2, 1986

[54] FILTER

[75] Inventors: Michael C. Bennett, Chart; Nicholas Coote, Ide Hill, Near Sevenoaks; Andrew Byers, Bromley, all of England

[73] Assignee: Tate & Lyle Public Limited Company, England

[21] Appl. No.: 740,208

[22] Filed: Jun. 3, 1985

[30] Foreign Application Priority Data

Jun. 1, 1984 [GB] United Kingdom ............... 8413982

[51] Int. Cl.$^4$ ............................................ B01D 23/14
[52] U.S. Cl. .................................. 210/793; 210/807; 210/275; 210/290; 210/503
[58] Field of Search ............................. 210/793–795, 210/806, 807, 275–279, 283, 284, 290, 502.1, 503

[56] References Cited

U.S. PATENT DOCUMENTS

| | | | |
|---|---|---|---|
| 293,745 | 2/1884 | Hyatt | 210/290 |
| 331,790 | 12/1885 | Hood | 210/290 |
| 1,788,510 | 1/1931 | Everson | 210/290 |
| 3,876,546 | 4/1975 | Hsiung et al. | 210/275 |

*Primary Examiner*—Ivars Cintins
*Attorney, Agent, or Firm*—Ostrolenk, Faber, Gerb & Soffen

[57] ABSTRACT

A deep bed filter of the type comprising an upright vessel of particulate filter medium, inlet means at the top of the vessel for introduction of an aqueous stream to be filtered, outlet means at the bottom for removal of filtered liquid and means for backwashing the medium by an upward flow of liquid, has as the filter medium bone char and sand, the bone char being located substantially above the sand. The sand generally comprises a particulate mineral filter material selected from silica sand, fused alumina, garnet, zircon, ilmenite and glass.

17 Claims, No Drawings

FILTER

This invention relates to filters for streams of water and other aqueous materials such as sugar syrups, and in particular to deep bed filters based on sand.

The deep bed filter in which water is filtered by passing downwards through a bed of sand and the filter is perodically cleaned by directing water upwards through the sand bed, is very well known in the water treatment industry and has been used for very many years. The usual form of such a filter is a large vessel containing a considerable depth of sand with an inlet for the water stream to be filtered at the top of the vessel, and an outlet at the bottom of the vessel. The water flows downwards through the sand depositing the suspended material in the interstices of the sand bed, and emerges at the bottom in its purified state. Clogging of the sand bed is prevented by periodic "backwashing" of the vessel by injecting water under pressure into the bottom of the vessel. The fast upward flow of water fluidizes the sand bed and releases the trapped impurities which can be floated away from the top of the vessel.

A problem that arises with such a system is that it is difficult to select a suitable particle size range. Small sizes suffer from rapid surface and interstice fouling, while with large particle sizes, insoluble material is carried though the vessel. Medium sizes tend to suffer from both shortcomings. In order to avoid this problem, it has become commonplace to use a dual bed filter. A filter of this type has a filter medium of two different particle size ranges. The larger particles are placed at the top of the vessel and the smaller particles at the bottom. Thus the coarse material higher up the vessel provides the first coarse filtration, and the finer material lower down the vessel provided a finishing "polish" filtration. This kind of system works quite well, but can suffer from fouling at the interface between the two different particle sizes.

A dual bed filter of this type also suffers from the problem that the backwashing stage of the process can redistribute the filter material so that in the end the fine particles are at the top of the vessel and the coarse particles at the bottom. In order to avoid, it is necessary for the coarser particles to be of a lower density and conventionally in the water industry, the larger particles comprise anthracite. Thus a conventional filter will comprise two beds: an upper bed of anthracite and a lower bed of sand. Even so, each bed tends to be re-graded during the fluidisation on backwashing a vessel, so that in each bed the larger particles tend to the bottom and the finer particles to the top. U.S. Pat. No. 3,343,680 discloses water filters containing materials of at least three different specific gravities, but the upper layer is still generally chosen to be anthracite.

A further problem encountered with anthracite is that it is not sufficiently dense and can easily be floated off the vessel during the backwashing process. This is particularly a problem if the backwashing is effected by the injection of a viscous filtered process stream, rather than pure water. It is obviously desirable to backwash using the process stream, particularly when fairly concentrated aqueous solutions are being filtered, in order to prevent dilution of the product. A yet further problem with anthracite is that while it is perfectly acceptable for water treatment, it is not expressly permitted as a food treatment agent for use with sugar syrups, etc.

There is thus a need for a modified deep bed filter which can be used for the rapid and complete filtration of various aqueous-based streams, especially food products. Examples of such streams include: sugar refinery liquors after initial clarification by phosphatation of carbonatation; high DE and low DE corn syrups after preliminary clarification; sugar syrups to be filtered prior to use in soft drinks, canned fruit, jams etc; sugar juice to be "polished" after juice clarification; sugar factory syrups after initial clarification by phosphatation or sulphitation; water purification as a replacement to existing sand filters; and pharmaceutical/fine chemical process streams to filter out cells debris and biomass after fermentations. Where sugar syrups are to be filtered, it is necessary to operate the filter at an elevated temperature, e.g. about 80° C. As explained above, it is also desirable to be able to backwash with the process stream in order to avoid dilution, and for that reason the upper bed in the vessel must be able to withstand being entrained by a relatively viscous syrup.

We have now found that particulate bone char is a very effective upper bed filter material. Bone char is a charred animal bone product, e.g. that supplied by British Charcoals & MacDonalds.

According to the present invention, there is provided a deep bed filter comprising an upright vessel of particulate filter medium, inlet means at the top of the vessel for introduction of an aqueous stream to be filtered, outlet means at the bottom for removal of filtered liquid and means for backwashing the medium by an upward flow of liquid, characterized in that the medium comprises bone char and sand, the bone char being located substantially above the sand.

The bone char to be used according to the invention is an ordinary commercial bone char and typically has a particle size of from about 0.4 mm up to about 5 mm depending on the degree of filtration required. Bone char is essentially hydroxyapatate partially coated with carbon, obtained by kilning animal bones. It has a specific gravity of from about 2.0 to about 3.0, but we find that a range of about 2.2 to 2.5 is required, especially when the sand layer has a specific gravity of 2.6 or more. Bone char typically has a sphericity of about 0.4 to 0.7 and a varied, angular particle shape.

The sand used in the lower bed will generally have a particle size of about half that of the bone char. The term "sand" used herein is intended to cover various particulate mineral filter materials such as silica sand, fused alumina, garnet particles zircon, ilmenite and glass beads. In general, the "sand" has a sphericity of about 0.6 to 0.9.

It will be understood that although the ranges of particle size, specific gravity, sphericity etc given in this specification refer to numerical limitations, there may be very minor amounts of the material in question having the stated parameter outside the stated range.

One particular advantage we find in the combination of bone char and sand is that a mixed bed can be achieved rather than the conventional separated dual bed. Thus the filter vessel will contain effectively all bone char at the top, all sand at the bottom and a gradation of mixtures of bone char and sand inbetween. A mixed bed is, in theory, more efficient than a dual bed, as it gives a complete grading of large particles from the top to small particles at the bottom without any sharp change in gradation such as is found at the interface of a dual bed. The mixed bed can be achieved by assembling the vessel with sand at the bottom and bone char on top and then fluidizing the system with an upward flow of water or aqueous process stream. When the particles settle again a mixed bed is formed. In practice, the sand may itself comprise materials of more than one type, e.g. silica sand and garnet, in which case the mixed bed will contain effectively all garnet at the bottom, all bone char at the top and combinations with silica sand inbetween.

Another advantage of bone char is that it is relatively hard and thus withstands the tumbling action of the backwashing and fluidising steps. The hardness is generally in the range of 3.5 to 4.5 (Mohs scale). The material contains about 9–11% by weight of carbon and has a total surface area of about 100 $m^2/g$.

For convenience, the bottom of the sand and bone char bed is supported by a layer of coarser mineral material such as gravel in the conventional manner, to prevent elution of the sand from the bottom of the vessel. The gravel is not mixed with the filter bed constituents and does not move when back washing occurs.

The respective depths of the various layers can be adjusted depending on the substance to be filtered. A particularly convenient arrangement for the filtration of sugar liquors is as follows: a vessel is provided with a base of coarse gravel (3–13 mm) or garnet of about 200 to 500 mm depth, typically about 250 mm. On top of the base is placed a layer of sand about 200–600 mm, typically about 500 mm, in depth followed by an upper layer of bone char about 200 to 600 mm, typically about 500 mm, in depth.

Above the bone char layer, the vessel should be provided with a sufficient head space for about 50–70% bed expansion during fluidization (typically about 600 mm). Above this is situated an outlet for the draining off the head space immediately above, i.e. further head space to a total head space of about 1–1.5 meters. A system of this type works at diameters from 150 mm up to large commercial installations of 2 meters or more diameter.

Depending on the type of liquor to be filtered, the filter can be designed as a fine, coarse, or "polish" system. A typical coarse bed filter has a lower layer of sand of about 250 mm depth, particle size about 1 to 1.5 or 2 mm and S.G. about 2.6–2.8, underneath an upper layer of bone char about 550 mm deep and about 2 to 3.4 mm particle size. A fine bed filter needs a higher sand to bone char depth ratio and smaller particles. A preferred arrangement is a lower layer of about 550 mm depth and about 0.5 to 1 mm particle size (S.G. about 2.6–2.8) below a bone char layer of about 450 mm depth and about 0.5 to 1.7 mm particle size. The coarse bed filter is particularly of use in connection with streams containing visible discrete flocs of greater than 10μ, the liquid being allowed to percolate through the filter by gravity or under the influence of a low shear pump. A fine bed filter is of particular use on streams containing very small haze-like flocs (2–100μ diameter) pumped downwards through the filter, e.g. by centrifugal pump.

For a polish filter, a preferred arrangement is either a double bed having an upper layer of bone char of about 0.4 to 0.9 mm particle size to a depth of about 250–300 mm above a lower layer of "sand" of SG about 3.6–4.33, e.g. garnet or fused alumina to a depth of about 500 mm; or a triple bed comprising an upper layer of bone char of about 1–1.5 mm particle size to a depth of about 250 mm, a middle layer of sand of about 0.5–1 mm particle size and S.G. about 2.6–2.8, e.g. silica sand, to a depth of about 250 mm and a lower layer of about 0.1–0.3 mm particle size of S.G. about 4.4–5.2, e.g. zircon sand or ilmenite sand, to a depth of about 250 mm.

A particularly preferred method of operating the filter according to the present invention involves a five step cleaning operation. First the upper headspace is drained and the bed is air scoured for a few minutes. Second the bed is backwashed with filtered liquor or with feed liquor. Third, the upper head space is again drained and the bed is given a second air scouring. Fourth the bed is given a second backwash with filtered liquor and then fifth the bed is graded by a special backwash procedure. This comprises a continuous backwashing using filtered liquor for an extended period (about 10 to 20 minutes for a coarse filter and about 20 to 30 minutes for a fine filter). The backwash fluidization level is typically about 50%.

According to a further feature of the present invention, we provide a method of filtering water or an aqueous solution, especially a sugar syrup or juice, comprising passing the liquid to be filtered through a sand and bone char filter as described above.

The following examples illustrate the invention further:

EXAMPLE 1

(Fine Media)

A filter was prepared by adding filter media to a purpose built filter unit (0.46 $m^2$ cross-sectional area), comprising a feed distribution at the top, a take off distribution system at the base, and a system to backwash the filter with filtrate when a preset pressure differential across the filter had been reached.

The media added were as follows:

(a) 460 mm of bone char of particle size in the range 0.6–1.7 mm;

(b) 560 mm of silica sand of particle size in the range 0.5–1.0 mm.

The media were placed on a gravel bed acting as a support, comprising:

(a) 200 mm of gravel of particle size in the range 3.0–6.0 mm;

(b) 200 mm of gravel of particle size in the range 6.0–12.0 mm.

The filter was assembled as follows. The gravel bed was assembled with the larger size placed at the bottom of the filter unit. Care was taken to rake the gravel into an even layer because its position does not change during backwash procedures. Then the sand was added and the bed was backwashed at 448 hl/$m^2$/h to fluidise the sand for 10 minutes. The sand bed was allowed to settle and the top 76 mm was removed leaving a layer 480 mm in depth. This technique was employed to remove fines. A similar technique was applied to the bone char layer, the top 50 mm being removed to leave a layer which would be expected to be about 406 mm in depth. In practice the total bed depth is less than the combined depth of the layers when added because, on fluidisation and subsequent settling, some of the sand is displaced into voids between the settled char particles to form a mixed bed of about 840 mm in depth. The stratification of the settled bed is such that substantially all parts of the bed contain sand and bone char, but the upper part is mostly bone char and the bottom mostly sand.

It should be noted that the gravel does not form part of the active filter.

This filter was used on phosphated sugar refinery liquor, from which most of the turbidity had been removed as a phosphate scum using 5 to 10 ppm of polyacrylamide flocculating agent with air flotation. The feed to the filter was via a centrifugal pump.

The filter was operated at a rate of 123 hl/m$^2$/h of clarified, phosphated sugar liquor, which contained insoluble solids in a range from 2 to 115 ppm, producing a filtrate containing from 0.6 to 70 ppm of insoluble solids. When a pressure differential across the bed of 680 mbar was reached, the following backwash sequences were applied to clean the bed:

1. The bed is drained down to discharge liquor from headspace. For a 1.8 m diameter filter this takes approx. 140 seconds.
2. Air sparge at 29 to 88 hl/m$^2$/h 420 seconds.
3. Settling period of 120 seconds.
4. Backwash with filtrate at 264 hl/m$^2$/h for 4 minutes.
5. Settling period of 120 seconds.
6. Repeat of steps 1 to 5.

The duration of filtration runs before the backwashing step varied from 0.5 h to 10 h (mean=4.35 h), depending on the amount of insoluble solids in the feed stock. The plant was operated for a total of 446 cycles producing 0.56 million hl of filtrate without apparent change in performance.

The results are tabulated below for two eight day periods with readings taken every eight hours.

| (a) Light Loading ppm (by filtration at 8–10 um, washing, drying and re-weighing) | |
|---|---|
| Clarified Liquor | After Filtration |
| 8.5 | 0.9 |
| 16.3 | 2.6 |
| 5.1 | 5.0 |
| 4.8 | 1.5 |
| 2.9 | 0.7 |
| 2.0 | 0.8 |
| 5.3 | 1.6 |
| 2.1 | 1.2 |
| 2.4 | 0.6 |
| 2.8 | 0.9 |
| 3.8 | 1.5 |
| 6.8 | 1.2 |
| 3.3 | 1.7 |
| 3.2 | 0.9 |
| 3.6 | 0.8 |
| 3.6 | 1.1 |
| 5.7 | 1.9 |
| 5.2 | 0.8 |
| 4.3 | 3.7 |
| 4.8 | 1.4 |
| 4.0 | 1.5 |
| 8.8 | 1.4 |
| 2.4 | 1.0 |
| 3.6 | 0.9 |
| Average 4.8 | 1.5: % removal = 69% |

| (b) Heaving Loading ppm (by filtration at 8–10 um, washing, drying and re-weighing) | |
|---|---|
| Clarified Liquor | After Filtration |
| 4.6 | 0.7 |
| 114.6 | 13.4 |
| 38.0 | 3.4 |
| 25.3 | 13.4 |
| 55.3 | 17.3 |
| 8.4 | 3.0 |
| 8.0 | 3.4 |
| 3.8 | 5.3 |
| 88.4 | 1.5 |
| 27.3 | 11.9 |
| 100.3 | 8.4 |
| 33.4 | 6.5 |
| 107.3 | 8.4 |
| 37.6 | 27.6 |
| 34.2 | 7.6 |
| 22.6 | 3.0 |
| 20.3 | 6.1 |
| 19.2 | 12.6 |
| 85.0 | 69.6 |
| 10.7 | 4.6 |
| 5.3 | 6.5 |
| 25.7 | 10.0 |
| Average 39.8 | 11.1: % removal = 72% |

EXAMPLE 2

(Coarse Media)

Using the same process stream as in Example 1, but using gravity feed from the clarifier, rather than the centrifugal pump (i.e. low shear conditions) filtration was carried out using the following filter.

The filter had the usual gravel base and the filtration media comprised:

Bone char (2.0–3.4 mm diameter) 560 mm
Silica sand (1.0–2.0 mm diameter) 230 mm.

Fines were not removed after fluidisation as the coarse bone char had been pre-screened. The filtration was effected at a rate of between 65 and 118 hl/m$^2$/h to a maximum pressure differential of 340 mbar. The backwashing sequences were the same as those in Example 1, except for step 4 when the backwashing was at a rate of 790 hl/m$^2$/h for 80 seconds.

The results are shown in the following Table:

| LENGTH OF OPERATING CYCLES FOR 0.46 m$^2$ FILTER (at feed rate of 118 hl/m$^2$/h) | | |
|---|---|---|
| RUN NO. | CYCLE TO 340 mbar (hours) | VOLUME FILTERED (hl) |
| 1 | 2.9 | 109 |
| 2 | 6.3 | 236 |
| 3 | 4.9 | 145 |
| 4 | 9.3 | 364 |
| 5 | 6.8 | 273 |
| 6 | 7.6 | 373 |
| 7 | 6.1 | 327 |
| 8 | 5.0 | 200 |
| 9 | 4.0 | 191 |
| 10 | 8.9 | 327 |
| 11 | 8.7 | 491 |
| 12 | 5.0 | 173 |
| 13 | 4.9 | 200 |
| 14 | 9.5 | 382 |
| 15 | 7.6 to 102 mbar | 295 |
| 16 | 9.5 | 336 |
| AVERAGE | 6.7 | 276 |

Particle reductions across a 0.46 m$^2$ filter at a feed rate of 118 hl/m$^2$/h

The particle loading of the streams was measured on a Hiac Royco type 4100 particle counter with the following results:

| Size range (μ) | ppm solids counted* Talofloc liquor (filter feed) | ppm solids* filtrate |
|---|---|---|
| 2.5–5.0 | <0.1 | <0.1 |
| 5.0–10.0 | 0.5 | 0.3 |
| 10.0–25.0 | 4.3 | 2.9 |
| 25.0–50.0 | 2.7 | 0.6 |
| 50.0–100.0 | 1.0 | <0.1 |
| 100.0 | <0.1 | <0.1 |
| TOTAL | 8.5 | 3.8 = 55% reduction in counted solids |

*assumes particles are spherical and of equal size at mean of each range.

Note that the filter is particularly effective at removing particles in the size range of 25–50μ, although a small amount of much smaller particles was removed in the 5–10μ range.

EXAMPLE 3

(Filtration of Corn Syrup using a Fine Bed Filter)

The feedstock was "thin" saccharified liquor at 29% w/w solids and 95 DE taken directly from the wierbox of a flotation clarifier, wherein most of the suspended solids and suspended oil have been removed in a flocculated aluminium hydroxide scum using 5 ppm of TALOFLOTE A5 (registered trade mark). The filter used was a small scale glass unit of 15 mm diameter. The bed composition was the same as that quoted in Example 1 and was prepared in the same fashion, with the exception that the fines removal was achieved by backwashing until the liquid in the headspace above the filter bed was clear.

The filter was operated at a flow rate of 118 hl/m²/h via a positive displacement pump (to reduce shearing of the floc) at a temperature of 71° C.

The filter was also operated using a 95 DE liquor that had been evaporated to 45–50% solids at a running temperature of 71° C. and at the same flow rate. Little or no pressure rise across the bed was observed, even after a running time in excess of 10 hours. This was attributed to the low level of solids in the stream to be filtered.

The backwash sequences were the same as those in Example 1, with the exception of step 4, where the backwashing rates were 684 hl/m²/h for 3 minutes (for the 29% solids stream) and 561 hl/m²/h for 3 minutes (for the 45–50% solids stream). The suspended solids levels were too low to be measured by dry weight analysis so a turbidity meter (Hach type 18900) was used with the following results. The first stream had an initial turbidity of 8 to 100 NTU (Nephelometry Turbidity Units) and a final turbidity of 3 to 10 NTU, while the second stream had an initial turbidity of 15 to 25 NTU and a final turbidity of 5 to 10 NTU.

We claim:

1. In a deep bed filter comprising an upright vessel of filter medium, inlet means at the top of the vessel for introduction of an aqueous stream to be filtered, outlet means at the bottom of the vessel for removal of filtered liquid and means for fluidizing and backwashing the medium by an upward flow of liquid, the improvement which comprises the filter medium comprising bone char having a specific gravity substantially in the range of 2.2 to 2.5 and a particulate mineral filter material, the bone char being located substantially above the mineral filter material.

2. The filter of claim 1, wherein the mineral filter material has a specific gravity substantially in the range of 2.6 or more.

3. The filter of claim 2, wherein the mineral filter material is selected from the group consisting of silica sand, fused alumina, garnet, zircon, ilmenite and glass.

4. The filter of claim 1, in which the particle diameter of the bone char is about 2 to 3.4 mm.

5. The filter of claim 4, in which the particle diameter of the mineral filter material is about 1 to 2 mm.

6. The filter of claim 1, in which the particle diameter of the bone char is about 0.6 to 1.7 mm.

7. The filter of claim 6, in which the particle diameter of the mineral filter material is about 0.5 to 1 mm.

8. The filter of claim 1, in which the diameter of the bone char is about 0.4 to 9 mm.

9. The filter of claim 8, in which the particle diameter of the mineral filter material is about 0.1 to 1 mm.

10. In a method of filtering an aqueous stream comprising passing said stream through a deep bed filter comprising an upright vessel of filter medium, inlet means at the top of the vessel for introduction of an aqueous stream to be filtered, outlet means at the bottom of the vessel for removal of filtered liquid and means for fluidizing and backwashing the medium by an upward flow of liquid, the improvement which comprises the filter medium comprising bone char having a specific gravity substantially in the range of 2.2 to 2.5 and a particulate mineral filter material, the bone char being located substantially above the mineral filter material.

11. The method of claim 10, in which the mineral filter material has a specific gravity substantially in the range of 2.6 or more.

12. The method of claim 10, in which the particle diameter of the bone char is about 2 to 3.4 mm.

13. The method of claim 12, in which the particle size of the mineral filter material is about 1 to 2 mm.

14. The method of claim 10, in which the particle diameter of the bone char is about 0.6 to 1.7 mm.

15. The method of claim 14, in which the particle diameter of the mineral filter material is about 0.5 to 1 mm.

16. The method of claim 10, in which the particle diameter of the bone char is about 0.4 to 9 mm.

17. The method of claim 16, in which the diameter of the mineral filter material is about 0.1 to 1 mm.

* * * * *